United States Patent Office 2,725,279
Patented Nov. 29, 1955

2,725,279
PREPARATION OF URANIUM HEXACHLORIDE

Ross E. Van Dyke and Ernest Charles Evers, Providence, R. I., assignors to the United States of America as represented by the United States Atomic Energy Commission No Drawing. Application August 13, 1946,
Serial No. 690,343

9 Claims. (Cl. 23—14.5)

This invention relates to the production of uranium hexachloride. More particularly, it relates to the production of uranium hexachloride by treatment of uranium pentachloride, uranium tetrachloride, uranium trioxide or mixtures of two or more of these reactants with a mixture of liquid carbon tetrachloride and chlorine.

There is a present need for large quantities of uranium hexachloride. This recently discovered substance is an iridescent dark green crystalline material having a vapor pressure of approximately 1 to 3 mm. Hg at 100° C. It decomposes rapidly under ordinary atmospheric conditions, i. e., in the presence of moist air, but is stable in vacuum and dry air, nitrogen, helium, and the like, at ordinary room temperature. It is comparatively soluble in carbon tetrachloride.

It is therefore an object of the present invention to provide a process suitable for producing uranium hexachloride in good yield and of high purity by the reaction of uranium pentachloride, uranium tetrachloride, uranium trioxide or mixtures of two or more of these reactants with a mixture of liquid carbon tetrachloride and chlorine.

In accordance with the present invention, we have found that uranium hexachloride may be prepared by reacting a mixture of liquid carbon tetrachloride and chlorine with a material selected from the group consisting of uranium pentachloride, uranium tetrachloride, uranium trioxide, and mixtures of two or more of these reactants at an elevated temperature.

While uranium trioxide may be reacted directly with a mixture of liquid carbon tetrachloride and chlorine, it has been found that greatly increased yields result when uranium pentachloride and/or uranium tetrachloride are present in the reaction.

The following examples are given for purpose of illustrating the various specific embodiments of the invention. It will be understood that these examples are given by way of illustration and not by way of limitation. All parts are given by weight unless otherwise specified. The pressure value as given in the examples is in pounds per square inch gauge unless otherwise specified.

*Example I.—Conversion of $UCl_5$ to $UCl_6$*

A charge consisting of 1000 g. $UCl_5$, 1600 g. $CCl_4$ and 160 g. $Cl_2$ was heated at 115° C. in a stainless steel autoclave and, after the heating period specified in Table 1, below, the reactor was cooled to approximately 50° C. and samples of the liquid phase were withdrawn for analysis.

TABLE 1

[Rate of formation of $UCl_6$ as a function of heating time at 115° C. Solvent contains 10% $Cl_2$.]

| Exp. No. | Heating Time, Hours | g. $UCl_6$/100 g. Solution |
| --- | --- | --- |
| A | 2 | 9.4 |
|   | 4 | 11.3 |
|   | 6 | 10.4 |
| B | 2 | 8.0 |
|   | 4 | 11.3 |
|   | 6 | 10.6 |

In the above two experiments, it may be seen that reaction, as measured by the concentration of $UCl_6$ in the solvent phase, was virtually completed in two hours, the production rate for a two-hour reaction being approximately 40–45 g./kg. $CCl_4$/hour.

*Example II.—Conversion of $UO_3$ to $UCl_6$ with $UCl_5$ added as promoter*

Experiments showing the influence of temperature and $Cl_2$ concentration on conversion of $UO_3$ to $UCl_6$ in the presence of $UCl_5$ are presented in Table 2. In each experiment, the charge consisted of 213 g. $UO_3$, 620 g. $UCL_5$ and 3200 g. $CCl_4$. This quantity of oxide would give, theoretically, a 9% solution on complete conversion to $UCl_6$; the mode ratio of $UCl_5/UO_3$ was 2:1. The reactions were carried out for three hours at the temperatures indicated. The reactor was cooled to approximately 50° C. and samples of the liquid phase were withdrawn for analysis. Included in the table is the maximum pressure recorded during each experiment.

TABLE 2

[Conversion of $UO_3$ to $UCl_6$ and the yield of $UCl_6$ as a function of $Cl_2$ concentration for constant charge. Three hours' heating at reaction temperatures ranging between 115° and 150° C.]

| Exp. No. | Reaction Temp., °C. | Percent $Cl_2$ | Gauge Pressure, lb./in.$^2$ | Percent Conversion of $UO_3$ | | g. $UCl_6$ per 100 g. $CCl_4$ |
| --- | --- | --- | --- | --- | --- | --- |
| | | | | $UCl_6$ | $UCl_5$ | |
| A | 115 | 19.1 | 202 | 144 | [1] —44 | 15.6 |
| B | 115 | 13.0 | 151 | 119 | —19 | 12.7 |
| C | 125 | 11.7 | 164 | 113 | —13 | 12.0 |
| D | 150 | 7.1 | 194 | 83 | 17 | 8.9 |
| E | 115 | 5.5 | 98 | 78 | 22 | 8.2 |

[1] Negative sign indicates conversion of $UCl_5$ to $UCl_6$.

On holding the charge constant, it may be seen that the conversion to $UCl_6$ decreases with decreasing $Cl_2$ concentration under the conditions employed in reaction.

The reaction may be conducted in an autoclave, or other essentially gas-tight closed vessel capable of withstanding the pressure developed during the operation. This autoclave or reactor may be constructed of stainless steel, glass-lined iron or steel, or other suitable resistant material, and should be provided with an agitator, inlets for introduction of the reactants, and outlet in the bottom of the reactor for removal of the reaction products, and an outlet or outlets in an upper portion of the reactor for removing or venting vapors and gases. Ordinarily, carbon tetrachloride is used in sufficient excess that this recovery operation is not used. The reactor and condenser may be suitably jacketed and provided with the usual means for circulating heat exchange fluid through the jackets. Safety valves, pressure and temperature indicating and/or recording devices may be provided if desired.

The uranium compounds which may be chlorinated to uranium hexachloride by this process are uranium trioxide, uranium tetrachloride, uranium pentachloride, and mixtures thereof. If uranium trioxide alone is used, it has been found that higher yields of uranium hexachloride may be obtained by adding additional chlorine to the reaction from time to time as the reaction progresses.

The process is preferably conducted in the presence of a substantial excess of carbon tetrachloride. For best results the amounts of the components of the charge to the autoclave are adjusted so that the solution is saturated with $UCl_5$ at all times. Preferably, where uranium trioxide is a reactant the ratio of this oxide to carbon tetrachloride should be adjusted so that the final concentration of $UCl_6$ will be about 10% $UCl_6$ based on the quantitative conversion of $UO_3$ to $UCl_6$.

When $UO_3$ is employed as charge material, it is also advisable to add a substantial quantity of $UCl_5$. Best results were obtained on employing a mole ratio of $UCl_5$ to $UO_3$ of between about one to one and about two to one. The addition of $UCl_5$ serves two purposes: (1) advantage is taken of the promoter action of $UCl_5$, thus enabling the reaction to be carried out rapidly at lower temperatures than is otherwise the case. If higher temperatures are employed the decomposition of $UCl_6$ is greater. (2) under proper conditions, the oxide may be converted entirely to $UCl_6$, thus ensuring no build-up of $UCl_5$ or conversion of $UCl_5$ to $UCl_6$ in the process. Without $UCl_5$ present, a certain proportion of the $UO_3$ is converted to $UCl_5$, in view of the equilibrium reaction:

$$2UCl_6 = 2UCl_5 + Cl_2$$

whereas, with two large an excess of $UCl_5$ (i. e., too little $UO_3$), there is partial conversion of $UCl_5$ to $UCl_6$.

Under ordinary conditions, it was found extremely difficult to prepare solutions containing more than approximately 10% of $UCl_6$ by weight (supposedly because of the limited solubility of $UCl_5$, since other conditions being the same, at equilibrium, the concentration of $UCl_6$ is determined by the concentration of $UCl_5$ according to the above equation). Hence, it is preferable to employ only enough $UO_3$ to yield a 10% solution of $UCl_6$ on complete conversion. When this is done, and the mole ratio of $UCl_5$ to $UO_3$ lies between about one to one and about two to one, enough $UCl_5$ is present to saturate the solution at all times. Under these conditions, the reaction is completel within approximately one hour at 115° C. and $UCl_6$ can be produced at a rate of about 100 g./kg. $CCl_4$/hr.

While the temperature employed in this process may vary depending upon the choice of reacting materials and their relative amounts, it has been found that temperature within the range of from about 65° C. to about 170° C. and preferably from about 100° C. to about 125° C. may be used.

Generally speaking the process is controlled so that during the period of reaction the pressure within the reactor increases to substantially above atmospheric, for example up to about 200 lbs. per square inch, depending upon the temperature and chlorine concentration.

While in the examples a particular method for recovering the product has been disclosed, the invention is not so limited. The uranium chloride may be recovered by other methods, including extraction, and/or classification with filtration, etc.

After reaction is completed, the reactor is cooled to temperatures between about 45° C. and about 70° C. and the solvent phase, containing the $UCl_6$, together with a certain yroportion of $UCl_5$, is withdrawn and the solvent is evaporated. The solvent is removed with the aid of an air stream preferably containing chlorine at temperatures below the boiling point of $CCl_4$ to reduce decomposition of $UCl_6$ to $UCl_5$. The reaction contents are cooled before withdrawing the solution in order to decrease the proportion of $UCl_5$ in the solution, since the solubility of $UCl_5$ decreases with decreasing temperature. If the solution is withdrawn at higher temperatures, or if the solvent is evaporated from the entire chloride mixture, the proportion of $UCl_6$ in the product will be much lower. By following the preferred practice the solutes obtained contain regularly 75%–85% $UCl_6$, the remainder being $UCl_5$.

By the process of this invention, there is provided a convenient and easily controlled method for preparing uranium hexachloride in good yield and in high purity.

Although the present invention has been described with particular reference to the specific details of certain embodiments thereof, it is not intended that such details shall be regarded as limitation upon the scope of the invention, except insofar as included in the accompanying claims.

We claim:
1. A process of preparing uranium hexachloride comprising reacting a mixture of liquid carbon tetrachloride and chlorine with a material selected from the group consisting of uranium pentachloride, uranium terachloride, uranium trioxide, and mixtures thereof, at an elevated temperature and recovering uranium hexachloride from the reaction products.

2. A process of preparing uranium hexachloride comprising reacting a mixture of liquid carbon tetrachloride and chlorine with a material comprising uranium pentachloride, at an elevated temperature and recovering uranium hexachloride from the reaction products.

3. A process of preparing uranium hexachloride comprising reacting a mixture of liquid carbon tetrachloride and chlorine with uranium pentachloride and uranium trioxide, at an elevated temperature and recovering uranium hexachloride from the reaction products.

4. A process of preparing uranium hexachloride comprising reacting liquid carbon tetrachloride containing up to 20% of chlorine by weight with uranium pentachloride, at an elevated temperature and recovering uranium hexachloride from the reaction products.

5. A process of preparing uranium hexachloride comprising reacting a mixture of liquid carbon tetrachloride and chlorine with a mixture of uranium tetrachloride and uranium pentachloride at an elevated temperature and recovering uranium hexachloride from the reaction products.

6. A process of preparing uranium hexachloride comprising reacting liquid carbon tetrachloride containing up to 20% of chlorine by weight with uranium pentachloride and uranium trioxide, at an elevated temperature and recovering uranium hexachloride from the reaction products.

7. A process of preparing uranium hexachloride comprising reacting liquid carbon tetrachloride containing up to 20% of chlorine by weight with uranium pentachloride and uranium trioxide, at a temperature between about 65° and about 170° C., the molar ratio of uranium pentachloride to uranium trioxide being between about 1:1 and about 2:1 and recovering uranium hexachloride from the reaction products.

8. A process of preparing uranium hexachloride comprising reacting liquid carbon tetrachloride containing up to 20% of chlorine by weight with uranium pentachloride and uranium trioxide, at a temperature between about 65° and about 170° C., the molar ratio of uranium pentachloride to uranium trioxide being about 2:1 and recovering uranium hexachloride from the reaction products.

9. A process of preparing uranium hexachloride comprising reacting liquid carbon tetrachloride containing up to 20% of chlorine by weight with uranium pentachloride and uranium trioxide, at a temperature between about 65° and about 170° C., the molar ratio of uranium pentachloride to uranium trioxide being about 1:1 and recovering uranium hexachloride from the reaction products.

References Cited in the file of this patent

Mellor: "Comprehensive Treatise on Inorganic and Theoretical Chemistry," vol. 12, 1932, page 57 (Quantin Corp. Rend. 1888, vol. 106, pp. 1074–75).

Rideal: J. Soc. Chem. Ind. 1914, vol. 33, pp. 673–674. Otto Ruff and Alfred Heinzelman, Danzig.

Z. Anorg. Chem. 72, pp. 63–84 (Chem. Abst. vol. 5, 1911, p. 3772).